Sept. 22, 1936.   A. J. GUTHRIE   2,055,288
CABINET
Filed Sept. 10, 1935   2 Sheets-Sheet 2
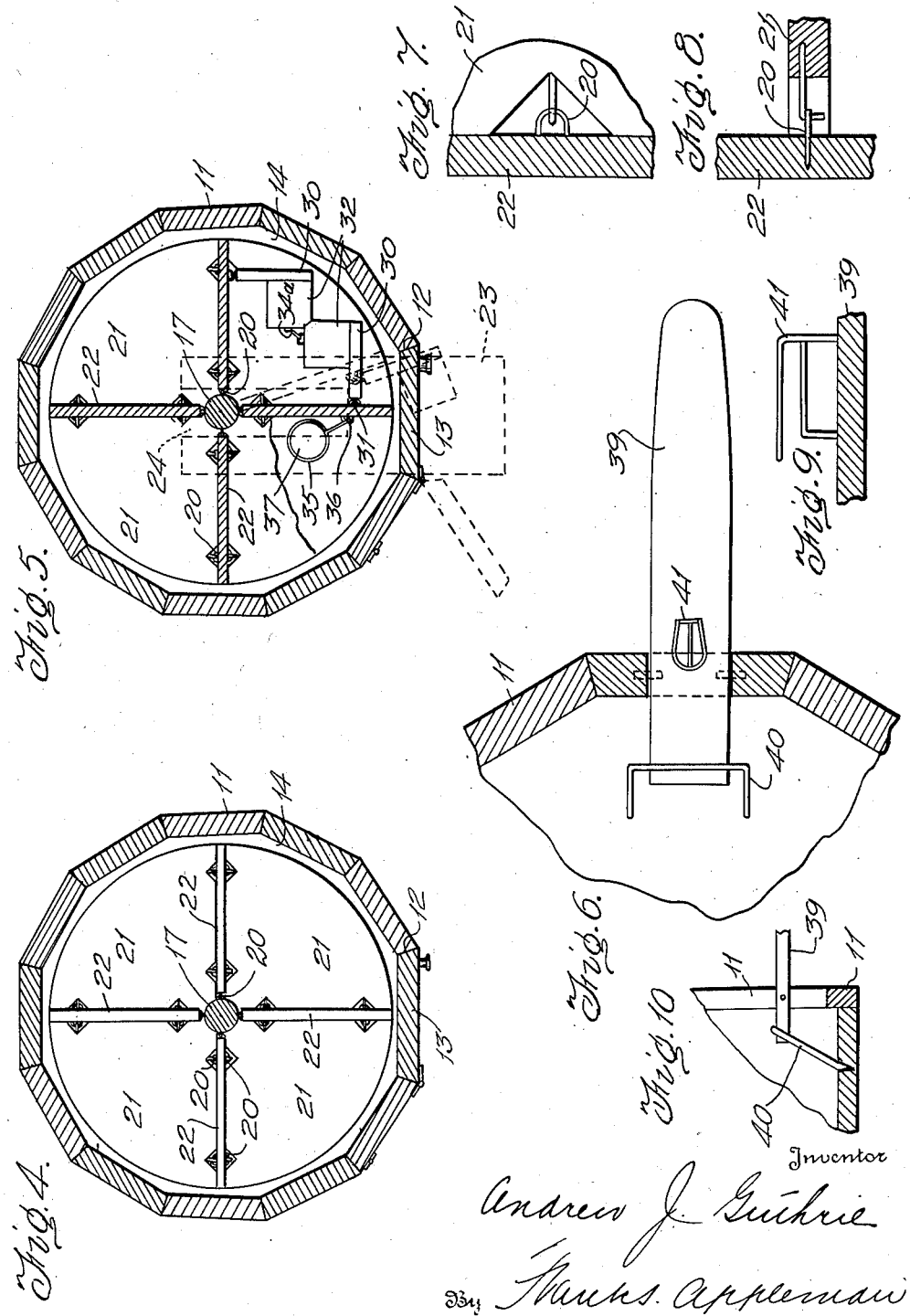

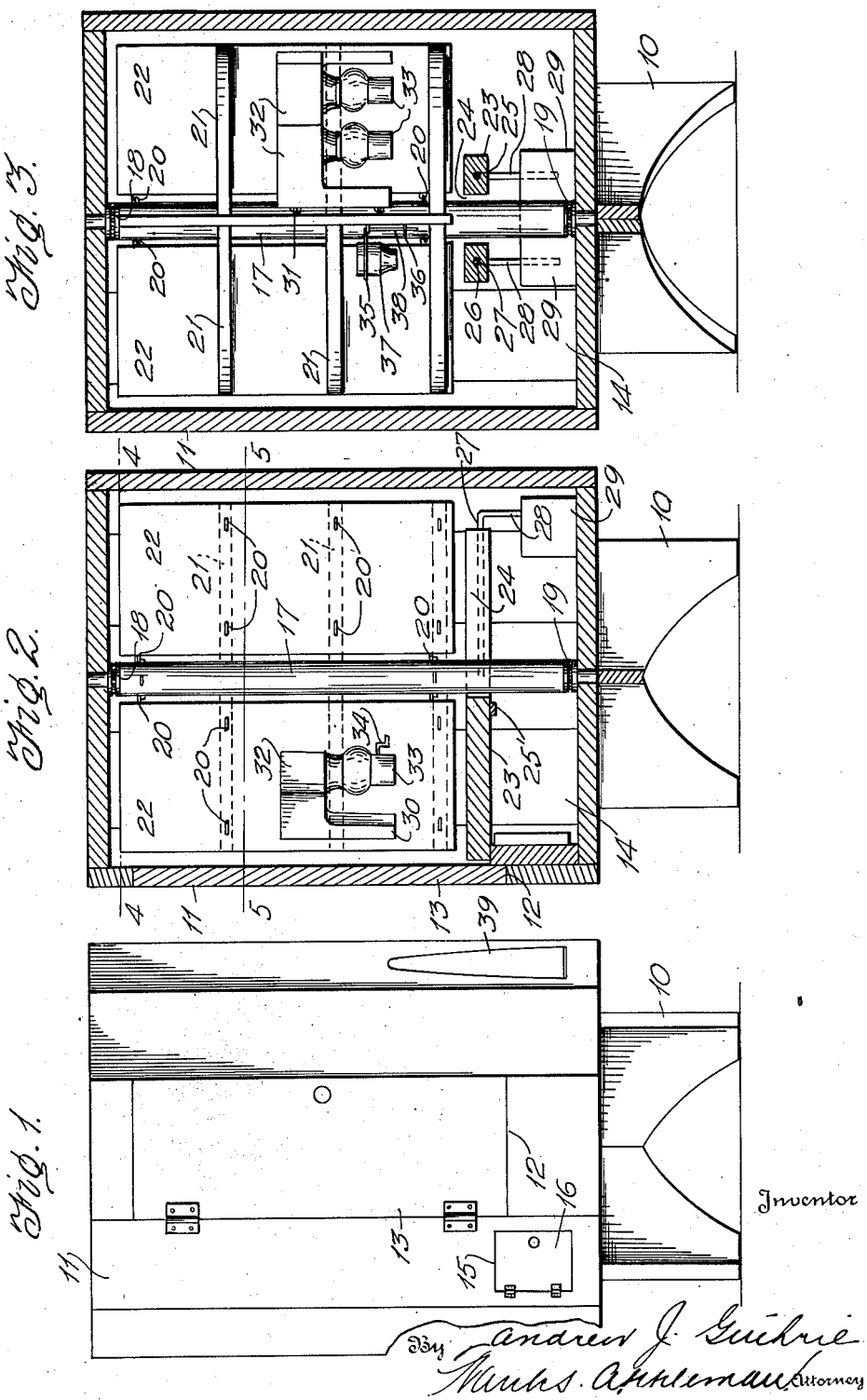

Patented Sept. 22, 1936

2,055,288

UNITED STATES PATENT OFFICE 2,055,288

CABINET

Andrew J. Guthrie, St. Albans, W. Va.

Application September 10, 1935, Serial No. 39,981

2 Claims. (Cl. 312—160)

This invention relates to cabinets of a type which may be of utility for holding commodities such as are used in kitchens or it may be used as a filing cabinet and devices which may be used in one capacity in connection with a kitchen may have other uses as adjuncts of a file case.

The invention will be described, however, more particularly in connection with its use as a kitchen cabinet and alternate utilities of the several parts will also be stated as the specification proceeds.

It is an object of the invention to provide a rotatively mounted casing or cabinet and to provide the same with supports or legs, which will permit access to the space between the cabinet and the floor on which it is supported in order that the floor may be kept free of accumulations of dust, dirt or the like, and it is furthermore an object of the invention to provide a mounting, preferably anti-friction in character, for rotatively supporting the interior of the cabinet so that it may be moved with respect to the casing proper in order that different sections, bins and other instrumentalities therein may be brought into position where they are accessible through an opening in the casing which opening is of course guarded by a door.

It is a further object of the invention to provide holders for commodities such as flour, meal, or condiments which are carried by the rotating device inside of the casing or cabinet to be moved into position to be accessible at the door, and it is furthermore an object of the invention to provide sectional shelves which may be removably supported on the rotary member and an extensible shelf movable through the opening in the casing and with relation to which the containers, bins or the like are movable.

It is furthermore an object of the invention to provide a bracket or support insertable in a portion of the wall of the casing or cabinet and mounted to project from the casing to form a shelf, ironing board or table and to provide means associated therewith for holding an iron or the like which may be employed in connection with the bracket.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a view in elevation of a cabinet, externally thereof;

Figure 2 illustrates a vertical sectional view thereof;

Figure 3 illustrates a similar view taken at right angles to Figure 2;

Figure 4 illustrates a sectional view of the cabinet on the line 4—4 of Figure 2;

Figure 5 illustrates a sectional view of the cabinet on the line 5—5 of Figure 2;

Figure 6 illustrates a sectional view of a fragment of the cabinet;

Figures 7 and 8 illustrate details of the removable supports for the shelves;

Figure 9 illustrates a sectional view of a fragment of the ironing board showing the iron holder thereof in elevation; and Figure 10 illustrates a detail view, partly in section, showing the ironing board and the device for retaining it extended.

In these drawings 10 denotes the base or legs which of course may be modified in construction to suit particular requirements and 11 denotes the outer casing which is preferably octagonal, although it may be of other configuration. An opening 12 is guarded by a door 13 suitably hinged and it is in relation to the said opening that the rotary portion of the cabinet is movable.

Suitable bins such as 14 may be provided and in such numbers as are needed, the same being accessible through openings such as 15 closed by suitable doors such as 16. Bins of this character may contain vegetables or other commodities or may be otherwise used.

A central post 17 is rotatively supported by anti-friction bearings such as 18 and 19 and said post is provided with a plurality of partition supporting elements 20 such as staples or eyes, the loops of which are occupied by hooks that have their shanks embedded in the partitions 22. The hooks and eyes may be interchangeable in that the hooks may be anchored in the post and the eyes or staples carried by the partitions, but in any event provision is made for supporting the partitions preferably pivotally. Shelves 21 preferably segmental in character have two edges which are parallel to partitions or wings 22 that radiate from the post. The groups of partitions or wings are preferably removably applied to the post by the aforementioned hooks and eyes or staples. The shelves are removably secured to the partitions by hooks and eyes similar to those by which the partitions are suspended.

A work-board 23 is arranged horizontally in the casing under the shelves and it is provided with a slot 24 forming a clearance for the post 17 which it straddles at its inner end. The board has bores or openings 25 and 26, each of which receives a bracket such as 27, which bracket has its inner end 28 embedded in a suitable anchor 29 stationary with the cabinet. The brackets are of such length that they engage the board even when it is pulled outwardly beyond the cabinet to be used as a work board, it being understood that the said board will rest on the sill of the door and that its inner end will be retained by the brackets. It is desirable to have a shoulder or stop 25' on the lower side of the board which will come in contact with the inner surface of the casing when the desired outward movement of the board is attained.

Brackets such as 30 are provided with suspending means 31 on a partition such as the aforesaid described hooks and staples or eyes and these brackets each have a bin 32 carried by or suspended from it for the purpose of containing flour, meal, or the like and the said bins may terminate in spouts such as 33 provided with cranks 34 which operate ordinary sifters so that the contents of the bin may be delivered free of foreign substances. While the particular form of sifter operating device is illustrated, it is to be understood that as a substitute therefor the ordinary reciprocating shifters may be used of a type where the sifter is held retracted by a spring so that when it is pulled out and released, it automatically returns to position to close the spout of the bin. These are well known types of sifters and it is believed unnecessary to illustrate the same.

In Figure 5 the bins are shown in plan and they are preferably held against movement during the rotation of the post until they are to be used for delivering their contents at the door, and in Figure 5 a fastening 34a is shown connecting the two bins whereby they are held against rotary movement until the fastening is released.

As of further utility, brackets such as 35 may be provided that are supported by staples or eyes 36, the said bracket which is shown in Figure 3 being of a type which embraces a condiment holder 37 to support it and having a shank 38 which is removably applied to the loops or eyes 36.

A shelf or ironing board 39 is trunnioned in an opening of the casing or cabinet and is of a shape corresponding to that of the opening. A portion of this member 39 extends beyond the trunnions and swings inwardly when the upper end of the member 39 is swung outwardly to an approximately horizontal position. The inner end of the member is engaged by a bracket 40 to limit the movement and to retain it in said horizontal position when the member is used as an ironing board or as a support for a typewriting machine or the like if the cabinet is used for filing purposes.

A bracket or holder 41 is carried by the member 39 and is preferably used for holding an iron for storage purposes when the bracket is out of use or as an iron rest when the ironing board is in use.

I claim:

1. In a cabinet, a casing having an opening, rotatably suported partitions and shelves therein, a work-board extensible through the opening, said work-board having longitudinal bores at its inner end, and brackets, mounted within the casing, having elongated portions fitting in the bores on which the work-board is slidable and operative to hold the inner end of the board in operative position when the outer end is projected from the casing.

2. In a cabinet, a casing having an opening, a rotatably mounted post, partitions oscillatably suspended from the post, shelves interposed between adjacent partitions, means removably connecting the partitions and shelves for suspending the shelves between the partitions, a workboard in the casing slidable transversely thereof and extensible through the opening, said workboard having longitudinally extending bores at its inner end, brackets suitably anchored in the casing and extending into the aforesaid bores on which the work-board is slidable and by which it is held, and means for limiting the outward movement of the work-board.

ANDREW J. GUTHRIE.